United States Patent
Eda et al.

(10) Patent No.: US 9,928,015 B2
(45) Date of Patent: *Mar. 27, 2018

(54) COPYRIGHT INFRINGEMENT PREVENTION

(71) Applicant: International Business Machines Corporation, Armonk, NY (US)

(72) Inventors: Sasikanth Eda, Andhra Pradesh (IN); Deepak R. Ghuge, Maharashtra (IN); Sridhar Puvvala, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,212

(22) Filed: Apr. 15, 2015

(65) Prior Publication Data
US 2016/0132897 A1 May 12, 2016

Related U.S. Application Data (63) Continuation of application No. 14/538,856, filed on Nov. 12, 2014.

(51) Int. Cl.
*G06F 11/00* (2006.01)
*G06F 3/12* (2006.01)
(Continued)

(52) U.S. Cl.
CPC .......... *G06F 3/1238* (2013.01); *G06F 3/1222* (2013.01); *G06F 17/271* (2013.01);
(Continued)

(58) Field of Classification Search
CPC .... G06F 3/1238; G06F 3/1222; G06F 17/271; G06F 17/2765; G06Q 50/184;
(Continued)

(56) References Cited

U.S. PATENT DOCUMENTS 6,711,277 B1   3/2004   Cok
7,110,541 B1   9/2006   Lunt et al.
(Continued)

FOREIGN PATENT DOCUMENTS

JP   2004094816 A   3/2004
WO   2010034653 A1   4/2010

OTHER PUBLICATIONS

Bengochea, et al., "Secure printing of confidential documents for nomadic users", Computing Sciences Department, May 2014, <http://www.researchgate.net/publication/221134619_Secure_Printing_of_Confidential_Documents_for_Nomadic_Users>.
(Continued)

*Primary Examiner* — Guy Lamarre
(74) *Attorney, Agent, or Firm* — Christopher McLane; Jason H. Sosa (57) ABSTRACT

In an approach for determining printability of an electronic file, a computer electronically receives a file for printing. The computer parses the file for one or more of text, images, and formatting indicative of potential copyrighted material. The computer, in response to identifying any text, images, or formatting indicative of potential copyrighted material, identifies potential copyrighted material within the file. The computer determines whether the file may be printed based, at least in part, on the identified potential copyrighted material. In another approach for determining printability of an electronic document, a computer electronically receives a document for printing. The computer locates attributes associated with the document and stored in a separate database, which includes one or more of the following: ownership, licensing information, printability, and number of prints allowed. The computer determines the document is printable based on the attributes and prints the document.

20 Claims, 3 Drawing Sheets

(51) Int. Cl.
*G06Q 50/18* (2012.01)
*G06F 17/27* (2006.01)
*G06K 9/00* (2006.01)
*G06Q 30/00* (2012.01)
*H04N 1/00* (2006.01)

(52) U.S. Cl.
CPC ..... *G06F 17/2765* (2013.01); *G06K 9/00456* (2013.01); *G06Q 30/0185* (2013.01); *G06Q 50/184* (2013.01); *H04N 1/00843* (2013.01); *H04N 1/00859* (2013.01)

(58) Field of Classification Search
CPC .......... G06Q 30/0185; H04N 1/00859; H04N 1/00843; G06K 9/00456
See application file for complete search history.

(56) References Cited

U.S. PATENT DOCUMENTS

| | | | |
|---|---|---|---|
| 7,339,691 B2 | 3/2008 | Ferlitsch | |
| 7,492,922 B2 | 2/2009 | Kacker et al. | |
| 7,567,355 B2 | 7/2009 | Matsunoshita | |
| 8,305,604 B2 | 11/2012 | McIntyre | |
| 8,643,871 B2 | 2/2014 | Morales et al. | |
| 2007/0083934 A1* | 4/2007 | McArdle | G06F 17/2211 726/26 |
| 2008/0192286 A1 | 8/2008 | Shaw | |
| 2010/0046015 A1 | 2/2010 | Whittle et al. | |
| 2010/0251382 A1 | 9/2010 | Goto et al. | |
| 2013/0174280 A1 | 7/2013 | Fujimori | |
| 2013/0246277 A1 | 9/2013 | Moseley et al. | |
| 2014/0071475 A1 | 3/2014 | Megawa | |

OTHER PUBLICATIONS

"Copyright @ Work Video", Copyright 2014 Copyright Clearance Center, downloaded Aug. 5, 2014, <http://www.copyright.com/content/cc3/en/toolbar/education/resources/copyright_at_work.html>.

"Copyright Is Video", downloaded Aug. 5, 2014, <http://www.copyright.com/content/dam/cc3/marketing/videos/video-copyright-is.html>.

"Preventing an Unauthorized Copy", Ricoh, Copyright 2008, <http://support.ricoh.com/bb_v1oi/pub_e/oi_view/0001036/0001036377/view/intro/unv/0012.htm>.

List of IBM Patents or Patent Applications Treated as Related, Apr. 8, 2015.

Sasikanth Eda, et al., "Copyright Infringement Prevention", U.S. Appl. No. 14/538,856, filed Nov. 12, 2014.

"Copyright @ Work", Video, © 1995-2017 Copyright Clearance Center, Inc, printed Jun. 20, 2017, 2 pages, <http://www.copyright.com/content/cc3/en/toolbar/education/resources/copyright_at_work.html>.

"Copyright is . . . ", Video, © 1995-2017 Copyright Clearance Center Inc, printed on Jun. 20, 2017, 2 pages, <http://www.copyright.com/learn/media-download/copyright/>.

* cited by examiner

COPYRIGHT INFRINGEMENT PREVENTION

BACKGROUND OF THE INVENTION

The present invention relates generally to the field of document analysis, and more particularly to preventing unauthorized replication of copyrighted materials.

Intellectual property refers to work (i.e., creative, intellectual, or artistic forms) produced by creations of the mind through the exercise and expenditure of creative talent and effort. The work produced may comprise music, literature, discoveries, inventions, words, phrases, symbols, etc. The creator of these works may be granted intellectual property rights. Intellectual property rights are legally recognized, exclusive rights to creations of the mind which entitle the creator the right to reproduce, distribute, display, and or perform the protected work, and create derivative works. Common types of intellectual property rights include patents (e.g., rights for discoveries and inventions), trademarks (e.g., rights for words, phrases, and symbols), and copyrights (e.g., rights for music, literature, and artistic works). Copyrights grant the creator of an original work exclusive rights to reproduce, prepare, distribute, and perform the original work for a limited period of time (i.e., life of the creator plus seventy years after death). In other words, a copyright gives the rights holder, a "right to copy" the work.

In some instances, copyrights may be considered sanctioned monopolies (e.g., single supplier of a commodity) which may interfere with a free market, freedom of speech, and education and equality of access. Therefore, in copyright law, exceptions and limitations exist which provide provisions to allow copyrighted works to be used without a license from the copyright owner, thus balancing the public's interest with the interest of the creator. Limitations and exceptions to copyrights include the fair use doctrine (which permits limited use in instances, such as search engines, news reporting, research, teaching, etc.), threshold of originality (i.e., threshold below which objects cease to be copyrightable), idea-expression dichotomy (i.e., limits the scope of a copyright by differentiating an idea from the expression), and the public domain (i.e., works whose intellectual property rights have expired or are otherwise available for public use).

Printers and image scanners are devices which are capable of creating identical, duplicate reproductions of an original item, such as a document or image. Printers create human-readable representations of graphics or text on physical media (e.g., paper or transparencies). Printers receive print job requests (e.g., electronic file to be printed), and store the information in a printer buffer (e.g., temporary memory) which is accessed by a print simultaneous peripheral operations on-line (SPOOL) which places the print jobs into a queue for processing. The print jobs are then processed, thus creating a duplicate copy or multiple, duplicate copies for utilization. Image scanners are devices which optically scan images, text, handwriting, etc., and create a digital image (e.g., electronic copy) of the information. A scanned image is created by placing hardcopy information upon the glass window of the image scanner. The image scanner utilizes a movable light source, in conjunction with fixed and movable mirrors, to scan the hardcopy and deliver the information to a charge-coupled device which processes the received information and creates the digital file. The digital image may then be stored on a computer or removable hardware (e.g., memory card) to be utilized, printed, or shared with other users.

SUMMARY

Aspects of the present invention disclose a method for determining printability of an electronic file. According to one embodiment of the present invention, a computer electronically receives a file for printing. The computer parses the file for one or more of text, images, and formatting indicative of potential copyrighted material. The computer, in response to identifying any text, images, or formatting indicative of potential copyrighted material, identifies potential copyrighted material within the file. The computer determines whether the file may be printed based, at least in part, on the identified potential copyrighted material.

Additionally, aspects of the present invention also disclose a method for determining printability of an electronic document. According to another embodiment of the present invention, a computer electronically receives a document for printing. The computer locates attributes associated with the document and stores in a separate database, wherein the attributes include one or more of the following: ownership, licensing information, printability, and number of prints allowed. The computer determines that the document is printable based on the attributes and prints the document.

DETAILED DESCRIPTION

Copyright infringement refers to the use of copyrighted works without permission, violating the exclusive rights of the copyright holder (e.g., right to reproduce, distribute, display, etc.). In utilizing any of the exclusive rights provided to the copyright holder without permission, the copyright holder may be entitled to compensation. Compensation may include damages (i.e., lost profits), statutory damages (i.e., multiple of the price which would have been paid for permission), fines, and potentially a jail sentence.

As recognized by embodiments of this invention, introduction of the Internet and World Wide Web, along with the development of digital media and computer network technologies, has brought about additional difficulties in enforcing copyrights and mitigating against inadvertent copyright infringement. Embodiments of this invention recognize copyright infringement may occur due to inadvertent actions taken by an individual not recognizing information to be copyrighted. Furthermore, printers and image scanners replicate (e.g., copies) documents, text, and images sent to the printer or scanned by the image scanner, both digitally (e.g., in memory) and physically (e.g., on paper), without regard to content. Embodiments of this invention analyze information (e.g., files) prior to printing to determine if the information is copyrighted. Embodiments of this invention may also determine if an individual is authorized to print identified copyrighted information, thus reducing the possibility of copyright infringement.

Figure 1:
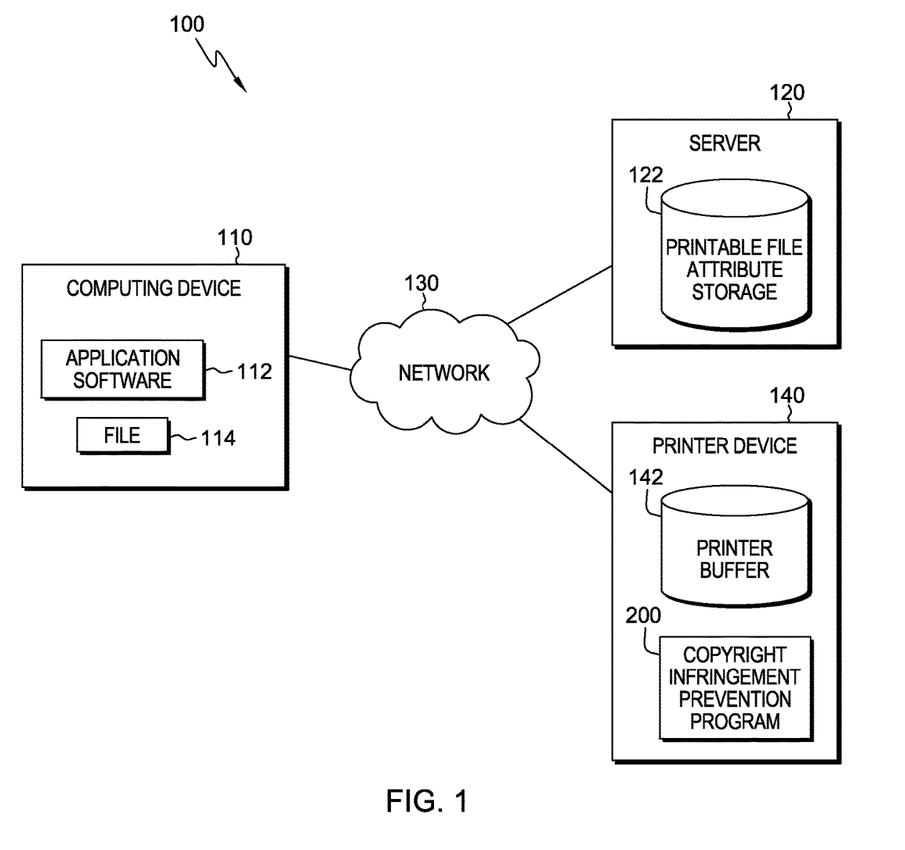
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes computing device 110, server 120, and printer device 140 interconnected over network 130. Distributed data processing environment 100 may include additional computing devices, mobile computing devices, servers, computers, storage devices, or other devices not shown.

Computing device 110 may be an electronic device or computing system, capable of executing machine readable program instructions and receiving and sending data. In various embodiments, computing device 110 may be a laptop computer, a tablet computer, a netbook computer, a personal computer (PC), a desktop computer, a personal digital assistant (PDA), a smart phone, or any programmable electronic device capable of communicating with another computing device via network 130. In other embodiments, computing device 110 may represent a computing system utilizing multiple computers and components acting collectively to perform a task when accessed through network 130, as is common in data centers and with cloud computing applications. Computing device 110 includes application software 112 and file 114.

Application software 112 is a set of one of more programs designed to carry out operations, including the capability for information to be sent to printer buffer 142 of printer device 140 for printing. In a preferred embodiment, application software 112 is a program which provides a selectable option to print a file such as file 114 (e.g., print command is selected from a drop down menu initiating the printing process). In another embodiment, application software 112 references programmed computer functions recognizing a selection from a keyboard (e.g., print screen key on a keyboard, combination of keyboard selections, print key on a printer) which may print the current viewable information or save the information as a screenshot as an electronic file. In the depicted embodiment, application software 112 resides on computing device 110. In another embodiment, application software 112 may reside on server 120 or on another device (not shown) connected over network 130. Application software 112 sends information to printer device 140, and the information is stored in printer buffer 142.

File 114 is a self-contained, electronic piece of information or data available to a user either on or through a computing device, such as computing device 110, that is capable of being stored and/or printed (e.g., text file, document, image, e-mail attachment, webpage). A printable file, such as file 114, may include text and/or graphics in a variety of formats (e.g., logos, pictures, stanza, drop cap based print, barcodes). File 114 may additionally include embedded metadata. Metadata may include information describing various attributes or fields associated with file 114. Take, for example, a current text file, such as an electronic document. The current electronic document will likely have existing attributes or properties that can be edited, including "Title," "Subject," "Authors," "Last saved by," "Comments," etc. Embodiments of the present invention may associate additional such descriptors with file 114, such as copyright ownership, print permissions, and other desired information. Persons of skill in the art will recognize that metadata associated with file 114 may be stored, accessed, and utilized in a number of ways. In one embodiment, file 114 is stored on computing device 110. In another embodiment, file 114 is stored on server 120. In some other embodiment, file 114 is a stored scanned image on printer device 140. In yet another embodiment, file 114 may be stored on another server or computing device, or may be accessed over the Internet and World Wide Web via network 130.

Server 120, in various embodiments, may be a laptop computer, a tablet computer, a netbook computer, a personal computer (PC), a desktop computer, a personal digital assistant (PDA), a smart phone, or any programmable device capable of communication with computing device 110 and printer device 140 over network 130. In other embodiments, server 120 may represent a server computing system utilizing multiple computers and components that act as a single pool of resources when accessed through network 130, as is common in data centers and with cloud computing applications. Server 120 includes printable file attribute storage 122.

Printable file attribute storage 122 is an organized collection of data associated with specific files, typically with regard to print permissions, and which may include information such as metadata, printer attributes, user id of a print job request (or historical print job requests), and file attributes (e.g., file name, date modified, file size, location, etc.) associated with file 114, supporting future processing of potentially copyrighted information. Metadata, as described above, provides additional information about data for file 114. Metadata associated with file 114 and stored in a separate database (e.g., printable file attribute storage 122) may act as an alternative to additional embedded metadata stored with file 114. In another implementation, additional metadata associated with file 114 may be both embedded in file 114 and stored in a separate database. Furthermore, in such a scenario, the additional metadata embedded with file 114 may describe different attributes of file 114 than the metadata stored in a separate database. The stored attributes may be assigned to file 114 through another application (e.g., e-mail client, web browser), manually through a user, or by a previous determination of copyright infringement prevention program 200.

Initially, copyright infringement prevention program 200 accesses printable file attribute storage 122 to determine whether file 114 has been printed previously and if it may be printed again. At completion, copyright infringement prevention program 200 stores the data determined (e.g., user id, number of copies printed, if file 114 includes copyrighted materials) associated with a print job request, along with file attributes of file 114 in printable file attribute storage 122 for future use. Printable file attribute storage 122 can be implemented with any type of storage device that is capable of storing data that may be accessed and utilized by copyright infringement prevention program 200. In one embodiment, printable file attribute storage 122 resides on server 120. In another embodiment, printable file attribute storage 122 resides on computing device 110. In other embodiments, printable file attribute storage 122 may reside on another server or another computing device connected over network 130, provided that printable file attribute storage 122 is accessible to copyright infringement prevention program 200.

Network 130 may be a local area network (LAN), a wide area network (WAN) such as the Internet, a wireless local area network (WLAN), any combination thereof, or any combination of connections and protocols that will support communications between computing device 110, server 120, printer device 140, and other computing devices and servers (not shown), in accordance with embodiments of the inventions. Network 130 may include wired, wireless, or fiber optic connections.

Printer device 140 is a device which accepts text and graphic output from a computing device, transferring the information to create a human-readable representation of the text of graphics on paper or a similar type of material. Examples of printer device 140 include printers capable of reproducing text and graphics in color, black and white, varying degrees of resolution (i.e., sharpness of text and images on paper), and printing speeds. Printer device 140 may transfer ink to paper or a similar material, generally without physical contact with an inked material, employing methods such as scanning with a laser beam to a photoreceptor (e.g., laser printer), thermal transference of a melted material over a print drum (e.g., solid ink printer), spraying of ink from an ink cartridge (e.g., ink-jet printer) in addition to other methods not mentioned. Printer device 140 may include built in memory that may be upgraded to handle more or larger print jobs, increase printing speeds, improved print quality, or a combination the aforementioned items. In one embodiment, printer device 140 may be a network or shared printer designed for high-volume and high speed printing for multiple users connected over network 130. In another embodiment, printer device 140 may be a personal desktop printer for an individual user connected directly to computing device 110. In some other embodiment, printer device 140 may be a combination printer and scanner (e.g., optically reads images and text, converting the information to a digital image). In one embodiment, printer device 140 receives file 114 from computing device 110. In another embodiment, printer device 140 receives file 114 as a scanned image from the built in scanner of printer device 140. Printer device 140 includes printer buffer 142 and copyright infringement prevention program 200.

Printer buffer 142, in one embodiment, references a temporary location within the built in computer memory of printer device 140 that stores and processes a print job (e.g., uniquely identified file or set of files assigned to a printer) prior to actual printing. In another embodiment, printer buffer 142 references a temporary location within memory of a computing device or server (not shown). Printer buffer 142 receives the print job (e.g., file 114) from computing device 110, allowing computing device 110 to continue operating while printer device 140 is printing. In one embodiment, printer buffer 142 is associated with network printers connected to multiple computing devices. In another embodiment, printer buffer 142 is associated with a single computing device. Printer buffer 142 stores the print jobs until the print spooler (e.g., software managing print jobs sent to the printer) retrieves and processes the print jobs for printing in the order received, on a first-come first-served basis. After printing, the print job is cleared from printer buffer 142. In one embodiment, printer buffer 142 receives file 114 from computing device 110. In another embodiment, printer buffer 142 receives file 114 as a scanned image created through a built in scanner of printer device 140. Printer buffer 142 is accessed by copyright infringement prevention program 200. Printer buffer 142 may also temporarily store additional information generated by copyright infringement prevention program 200.

Copyright infringement prevention program 200 is a program (e.g., application software, firmware) which assists in determining whether file 114 should be printed by printer device 140. In the depicted embodiment, copyright infringement prevention program 200 is incorporated into the software or memory of printer 140. In another embodiment, copyright infringement prevention program 200 may be a background application (e.g., program which is always running but not continuously interacted with) on computing device 110 monitoring print job requests. In some other embodiment, copyright infringement prevention program 200 resides on server 120. In yet some other embodiment, copyright infringement prevention program 200 may reside on another server, computing device, or another printer device connected over network 130, provided that copyright infringement prevention program 200 has access to file 114 and printable file attribute storage 122. Copyright infringement prevention program 200 initiates upon receipt of an indication of a print job request (e.g., selecting "print" from a dropdown menu within an application begins a chain of actions to process the print job request and accesses printer 140 and associated software). Copyright infringement prevention program 200 executes prior to allowing file 114 to be printed. Copyright infringement prevention program 200 may determine if file 114 includes copyright materials. Copyright infringement prevention program 200 may also determine whether a user id is authorized to print copyrighted material within file 114. Additionally, copyright infringement prevention program 200 may assist in limiting the distribution of approved copyrighted materials by restricting the number of copies allowed to be printed.

Figure 2:
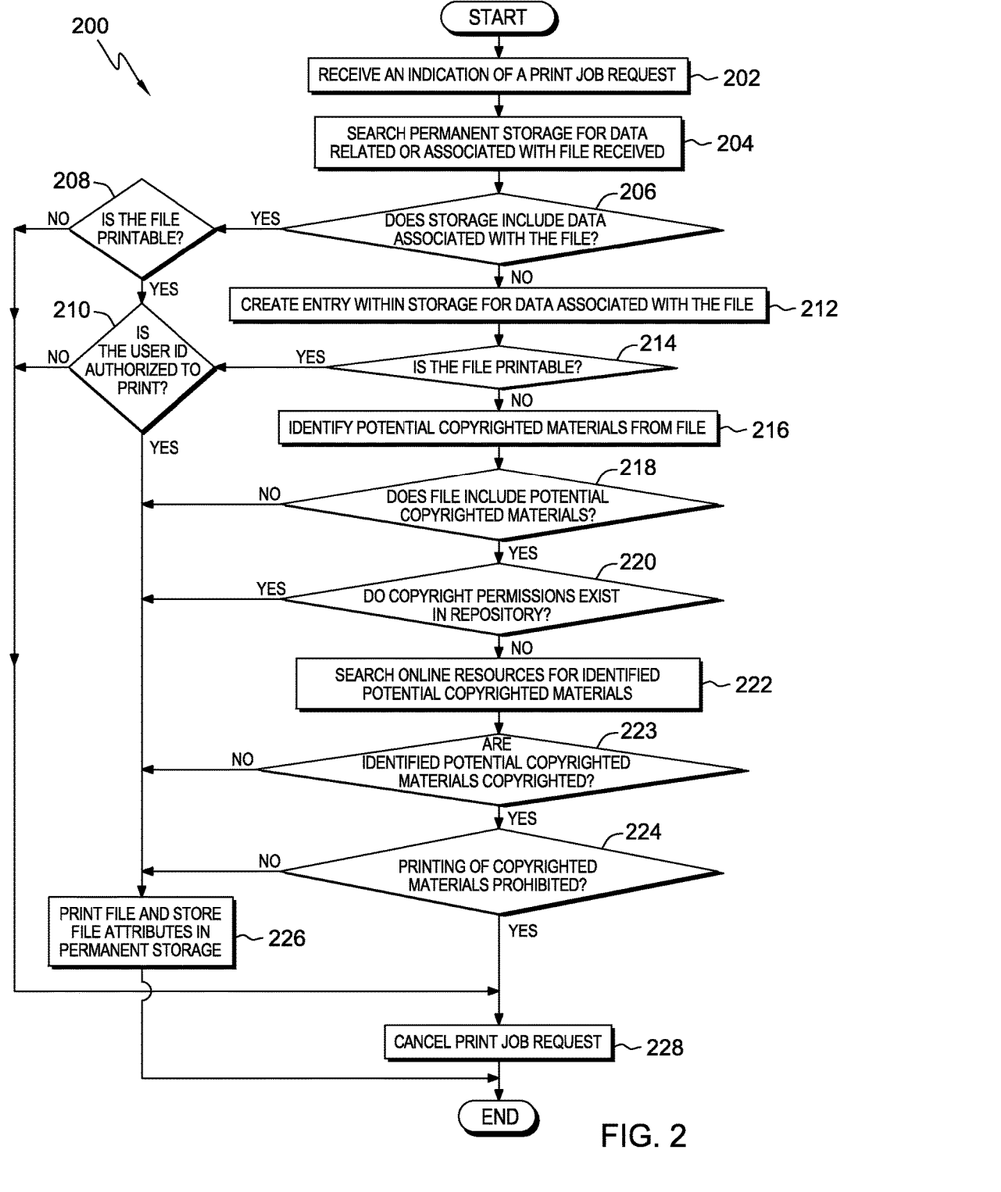
FIG. 2 is a flowchart depicting operational steps of a copyright infringement prevention program, within the data processing environment of FIG. 1, for analyzing printable file requests and determining authorization to print in the event of copyrighted materials being present in the printable files, in accordance with an embodiment of the present invention.

FIG. 2 is a flowchart depicting operational steps of copyright infringement prevention program 200 for analyzing print job requests of file 114 and determining authorization to print in the event of copyrighted materials being present in file 114, in accordance with an embodiment of the present invention.

In step 202, copyright infringement prevention program 200 receives an indication of a print job request. In one embodiment, copyright infringement prevention program 200 receives an indication of a print job request for file 114 through application software 112 on computing device 110. In another embodiment, copyright infringement prevention program 200 receives file 114 as a scanned image through printer device 140 when a scan is initiated.

In step 204, copyright infringement prevention program 200 searches permanent storage for data related to or associated with the file received through the print job request. In one embodiment, the data related, to or associated with, the file may actually include a copy of the file itself. While, in one implementation copyright infringement prevention program 200 will search local storage on printer device 140, in a preferred embodiment, copyright infringement prevention program 200 will search accessible web-based storage, e.g., printable file attribute storage 122 on server 120. This has several advantages, including not requiring that printers maintain high capacity storage and allowing multiple printers to access the same, existing version of maintained files. Copyright infringement prevention program 200 searches printable file attribute storage 122 for data associated with file 114 (e.g., searches for the same file name).

In decision 206, based on its search of permanent storage, copyright infringement prevention program 200 determines whether printable file attribute storage 122 includes data associated with the requested file to be printed. This will often be the case, for example, with a print job request for file 114 which has not previously been printed. In one embodiment, to ensure that the stored data is truly associated with the specific file to be printed (e.g., file 114), multiple attributes are considered and matched. For example, an identical document title may be found in printable file attribute storage 122. However, there could be different versions of a similarly titled document, or other factors allowing two different documents to be associated with the same title or other file attribute, and copyright infringement prevention program 200 may compare additional file attributes, such as the date modified, file size, and author to further determine whether a match is found.

If copyright infringement prevention program 200 determines that printable file attribute storage 122 does not include data associated with file 114 to be printed (decision 206, no branch), copyright infringement prevention program 200 creates at least one entry in printable file attribute storage 122 in which to store data associated with file 114 (step 212), including, for example, the specific print request being handled. As additional information is gained with respect to file 114, the associated entry may be updated with this information for future use.

If copyright infringement prevention program 200 determines that printable file attribute storage 122 does include data associated with file 114 to be printed (decision 206, yes branch), copyright infringement prevention program 200 determines whether file 114 is printable (decision 208).

In decision 208, when determining whether file 114 is printable, copyright infringement prevention program 200, in various embodiments, may access attributes stored in the embedded metadata of file 114 and/or attributes stored in association with file 114 in a separate database. In one embodiment, embedded metadata in file 114 may include a print permission field. Such a field may be set to "printable," "not printable," "unknown," or other indications of whether file 114 may be printed (e.g., "yes" or "no"; "0" or "1", etc.). Copyright infringement prevention program 200 may identify the contents of such a field to determine printability. Such a field may be set upon original receipt of the document, may be manually entered, or may automatically entered or amended based on a previous iteration of copyright infringement prevention program 200.

As an example, a company may obtain copyrighted material under a licensing agreement. Upon receipt, the obtained file 114 may automatically have a field set to "printable" or "not printable" based on licensing terms. Alternatively, based upon the licensing terms, an administrator for the company may manually set the field. Such a licensing agreement may include a limited number of times that file 114 may be printed. This number may also be stored as embedded metadata, and could be decreased with each print request. While the count is greater than zero, the printability field may continue to be set to "printable". When such a count were to reach zero the printability field could be adjusted to "not printable." Alternatively, copyright infringement prevention program 200 may examine both the printability field and an existing count field.

As another example, when file 114 is owned or created by the company, a default setting may be "printable," or this may be entered by an administrator or other employee.

In another embodiment, the above discussed attributes may be stored separately from file 114 (e.g., in printable file attribute storage 122). This is beneficial when file 114 does not have additional descriptive metadata added to them, or if there are multiple copies of file 114 that do have such attributes. For example, if file 114 does not have metadata associated with it, copyright infringement prevention program 200 can create associations and attributes including, in one embodiment, a determination of whether file 114 is "printable" or "not printable" (as discussed with regard to steps 216-224). Any subsequent request to print the same file 114 could then be accomplished without having to repeat the determination. In the case of multiple copies of file 114, for example, a count attribute of a number of allowed print jobs within printable file attribute storage 122 would ensure that additional prints of alternate copies are also taken into account.

If copyright infringement prevention program 200 determines file 114 is not printable (decision 208, no branch), copyright infringement prevention program 200 cancels the print job request (step 228). If, on the other hand, copyright infringement prevention program 200 determines file 114 is printable (decision 208, yes branch), copyright infringement prevention program 200 may determine whether the user id is authorized to print (decision 210). This optional determination allows for the possibility that only a specific subset of user ids may be authorized to print or make copies of file 114. A field or attribute associated with file 114 may be set (e.g., either embedded within file 114 or in a central database) identifying such authorized user ids. If the user id submitting the print job request is not authorized (decision 210, no branch), copyright infringement prevention program 200 cancels the print job request (step 228).

If file 114 is "printable" (decision 208, yes branch) and, optionally, if the user id is authorized to print (decision 210, yes branch), file 114 is printed and any identified or altered attributes are stored in printable file attribute storage 122 (step 226). For example, if there is a "count" attribute for allowable prints, this will be reduced by one. Attributes may also be updated in embedded metadata. Additionally, any attributes stored within embedded metadata of file 114 may be used to update attributes stored in printable file attribute storage 122.

Returning to decision 206, as previously mentioned, if copyright infringement prevention program 200 determines printable file attribute storage 122 does not include data associated with file 114 (decision 206, no branch), copyright infringement prevention program 200 creates at least one entry in printable file attribute storage 122 in which to store data associated with file 114 (step 212).

In decision 214, copyright infringement prevention program 200 determines whether the file 114 is printable. As discussed with regard to decision 208, copyright infringement prevention program 200 may analyze file 114 attributes from the metadata attached to file 114 (e.g., print permission field, number of copies, etc.). Unlike decision 208, however, in decision 214 because attributes did not previously exist in printable file attribute storage 122, copyright infringement prevention program 200 can only utilize existing embedded metadata attached to file 114.

If copyright infringement prevention program 200 determines file 114 is printable (decision 214, yes branch), copyright infringement prevention program 200 may determine whether the user id is authorized to print (step 210), and will ultimately print file 114 (step 226) or cancel the print job request (step 228) as discussed previously. If copyright infringement prevention program 200 determines file 114 is not printable (or at least not specifically designated as printable) (decision 214, no branch), copyright infringement prevention program 200 determines whether file 114 may be printed irrespective of the indicator assigned within the print permission field. One implementation of this determination is embodied by collective steps 216-224. While file 114, received or obtained under certain conditions, may have clear indications of copyright and/or printability, this may be more difficult to ascertain in other variations of file 114. For example, file 114 may be obtained from the internet or scanned into a computer or printer without regard to copyright, and a user may attempt to print file 114. In an instance such as this, file 114 may be assigned a default attribute of "not printable" or may not include a "printability" field. Copyright infringement prevention program 200 will assess and determine the printability of these variations of file 114 as well. In another embodiment, a "not printable" attribute indicates no further assessment should be performed and the print job should be canceled. In such an embodiment, steps 216-224 may only occur in response to no indication or an inconclusive indication of whether or not file 114 is "printable."

In step 216, copyright infringement prevention program 200 identifies potential copyrighted materials from file 114. Copyright infringement prevention program 200 searches file 114 for various indications that materials within file 114 are potentially copyrighted. Indicators may include specific images, textual words or phrases, formats, and identifiers. In one embodiment, copyright infringement prevention program 200 may identify images and text while searching file 114 based on stored and predetermined images (e.g., fonts, bars, marks, captions, symbols etc.) used to denote publications. For example, copyright infringement prevention program 200 may identify the copyright "©" image and/or the associated text "Copyright © 2008 Author Name All rights reserved" as an indication that copyrighted materials exist within file 114. In another embodiment, copyright infringement prevention program 200 may identify one or more formats indicative of potential copyrighted information or material (e.g., drop cap based print, stanza, columns of text, etc.). For example, copyright infringement prevention program 200 may identify drop cap based print (i.e., enlarged first letter of the first word starting a paragraph, spanning multiple lines) in conjunction with double column text, indicating a periodical or newspaper article. Copyright infringement prevention program 200 may also identify commercial publication identifiers (e.g., International Standard Book Number (ISBN), barcode, International Standard Serial Numbers (ISSN)). For example, copyright infringement prevention program 200 may identify a thirteen digit number within a document, which corresponds to an ISBN number associated with a published book. In one embodiment, copyright infringement prevention program 200 may set an attribute or a flag within file 114, or within printable file attribute storage 122, to indicate whether file 114 does or does not include identified potential copyrighted materials.

If copyright infringement prevention program 200 determines file 114 includes identified, potential copyrighted materials (decision 218, yes branch), copyright infringement prevention program 200 determines whether the potential copyrighted materials included in file 114 exist in a repository of approved copyrighted materials (decision 220). If copyright infringement prevention program 200 determines file 114 does not include potential copyrighted materials (decision 218, no branch), copyright infringement prevention program 200 prints file 114. (step 226)

In decision 220, copyright infringement prevention program 200 determines whether permissions exist in the repository for the identified potential copyrighted material which are approved for use. "Approved" material, within the repository may be, for example, material to which license or right to the material has been acquired, or the reproduction of which may have previously been determined to comport with current law. Copyright infringement prevention program 200 accesses the repository of approved copyrighted materials (as identified by company logos, licenses, subscription agreements, copyright permissions, etc.) in permanent and/or temporary memory (e.g., printer buffer 142) or, for example, on server 120. Copyright infringement prevention program 200 searches the approved copyrighted materials for the indicators of identified, potential copyrighted materials identified in file 114 (e.g., company logos, images, text etc.). Copyright infringement prevention program 200 compares the identified potential copyrighted materials with the approved copyrighted materials. Copyright infringement prevention program 200 may identify a match within the approved copyrighted materials of the repository. When a match is identified, copyright infringement prevention program 200 may perform additional comparisons between approved copyright data and the identified potential copyright data (e.g., text comparison, file attribute comparisons).

For example, an ISBN within file 114 is identified as indicative of potential copyrighted materials. Copyright infringement prevention program 200 searches the approved ISBN entries within the repository of approved copyrighted materials for the identified ISBN. Copyright infringement prevention program 200 matches the identified ISBN with an approved ISBN entry within the repository of approved copyrighted materials. Copyright infringement prevention program 200 then compares the portion of text identified as potential copyrighted materials from file 114 to the text in the repository associated with the ISBN. If the text matches, copyright infringement prevention program 200 determines the potential copyrighted material to be approved copyrighted material.

Alternatively, copyright infringement prevention program 200 may not identify a match within the approved copyrighted materials of the repository. For example, column based text (e.g., newspaper article format) is present in file 114, which may indicate file 114 includes potential copyrighted materials. The column based text is not stored within the repository of approved texts; therefore, copyright infringement prevention program 200 determines file 114 may include unapproved copyrighted material and continues additional processing to determining if printing is allowed.

In step 222, copyright infringement prevention program 200 searches available online resources (e.g., webpages and online databases) for identified potential copyrighted materials utilizing search engines and application search functions. In one embodiment, copyright infringement prevention program 200 searches for the identified, potential copyrighted material from file 114 by predetermined standards set within copyright infringement prevention program 200 (e.g., complete text, number of lines of a complete text, ISBN, metadata indicating author name). For example, the title of a publication was extracted from the embedded metadata and is entered into an online database (e.g., standard search engines, Copyright Clearance Center, public record search of the United States Copyright Office) as search criteria. If the title is registered, results are returned, including information pertaining to the publication (e.g., registration number, title, copyright claimant, contact information, etc.). Additionally, some online database services may also include existing copyright permissions (e.g., license is owned by a user or entity through previous actions) and options to acquire permissions. In another embodiment, copyright infringement prevention program 200 may perform searches for the identified potential copyrighted material from file 114 (e.g., keywords, portion of text, verses) as determined by a user. For example, file 114 includes two pages of potential copyrighted materials in a stanza based format (e.g., the text appears similar to song lyrics and includes repetitive lines of text). Copyright infringement prevention program 200 may provide the user an option to define a search. The user is able to reduce the amount of text to a single line of repetitive text and may select specific search engines, creating a tailored and possibly more efficient search.

In some other embodiment, copyright infringement prevention program 200 searches for identified potential copyrighted materials within file 114 with a plagiarism checker. Plagiarism checkers retrieve documents containing similar text to the identified potential copyrighted material of file 114 within a set threshold, and perform comparisons to determine a likelihood of plagiarism. Copyright infringement prevention program 200 may search by one or more of the aforementioned items for identified, potential copyrighted materials, as selected by a user and/or by predetermined set standards. For example, a user may select just the portion of text within a document that includes drop cap based print for the plagiarism checker. The drop cap based print will then be evaluated to determine a percentage of similar text which, dependent on the threshold set, will indicate the likelihood of file 114 including plagiarized information.

In decision 223, copyright infringement prevention program 200 determines whether the identified potential copyrighted materials are copyrighted. Copyright infringement prevention program 200 reviews the online resource results of the web based and online database searches and the results of the plagiarism checker. For example, file 114 may be a report which includes a title reference. The online database search results return copyright information, based on the title, which indicates file 114 may include copyrighted materials, thereby triggering additional assessment. The plagiarism checker then analyzes the materials within file 114, and a uniqueness score of ninety-seven percent is returned. Copyright infringement prevention program 200 determines the materials are not plagiarized, are not subject to another's copyright, and may be printed. Alternatively, the returned results may indicate file 114 may be copyrighted such as, in a slightly modified example, the plagiarism checker returns a uniqueness score of five percent which is below the set threshold (e.g., text is plagiarized), and the copyrighted materials may, therefore, be subject to another's copyright. If copyright infringement prevention program 200 determines the potential copyrighted materials are not copyrighted, (decision 223, no branch), copyright infringement prevention program 200 prints file 114 and stores the file attributes (step 226). If copyright infringement prevention program 200 determines the potential copyright materials are copyrighted, (decision 223, yes branch) copyright infringement prevention program determines whether printing of the copyrighted materials are prohibited (decision 224).

In decision 224, copyright infringement prevention program 200 determines whether the printing of the copyrighted materials is prohibited. Copyright infringement prevention program 200 assesses the results of the online resource searches and the results of the plagiarism checker. Based on the search results, copyright infringement prevention program 200 may determine the copyrighted materials exist in the public domain and are not subject to another's copyright, such as when copyrights have expired and printing is not prohibited. In other instances, a copyright license is determined to already be owned for file 114 and printing is not prohibited. For example, an ISBN search of the Copyright Clearance Center from a user account shows a license is already owned by an entity (e.g., corporation, individual, etc.); therefore, printing is not prohibited.

Copyright infringement prevention program 200 may also take into account the results of the plagiarism checker when file 114 is not in the public domain and licenses are not currently owned. Copyright infringement prevention program 200 may utilize a threshold based on a calculated percentage of the entire copyrighted material which is represented by the plagiarized materials in conjunction with the terms of fair use to determine printability. For example, the uniqueness score of file 114 is seventy five percent (e.g., a quarter of the text is plagiarized from copyrighted materials). Copyright infringement prevention program 200 then determines the actual percentage of the plagiarized copyrighted materials utilized to be two percent of the copyrighted materials (e.g., ninety-eight percent of the copyrighted material was not plagiarized). Under fair use, the copyrighted materials would not exceed the acceptable threshold, and the printing of file 114 may be allowed. However, in an alternate example, the uniqueness score is fifty percent for file 114 (e.g., half of the materials are plagiarized), but the actual percentage of the copyrighted materials utilized is one hundred percent (e.g., all of the copyrighted material is plagiarized in file 114). With respect to fair use, the acceptable threshold would be exceeded, and the printing of file 114 would be prohibited.

Copyright infringement prevention program 200 may alternatively determine the copyrighted materials are subject to another's copyright and are prohibited (e.g., not found in the public domain, invalid or no copyright license is held, do not pass the threshold for plagiarism with regards to fair use) and may not be printed. For example, a user attempts to print file 114 which is a chapter of a book and includes an ISBN number. File 114 was determined to be copyrighted material as the ISBN is associated with a copyrighted publication, and the plagiarism checker failed with a uniqueness score below a set threshold (e.g., text was plagiarized). Through the ISBN search of the online database (e.g., Copyright Clearance Center), the results reveal the rights holder as a publishing company, and permissions are only available through contacting the rights holder. As the user is not the rights holder and did not previously acquire a license from the rights holder (e.g., permissions were not noted within the user's account), copyright infringement prevention program 200, therefore, determines file 114 cannot be printed.

If copyright infringement prevention program 200 determines the printing of the copyrighted materials is prohibited (decision 224, yes branch), copyright infringement prevention program 200 cancels the print job request (step 228). In another embodiment of step 228, copyright infringement prevention program 200 may cancel the print job and send a notification to the user. For example, the user may receive a notification including the search results, plagiarism uniqueness score, and options to acquire permissions through the Copyright Clearance Center from which further actions by the user may be taken prior to attempting another print request of file 114. If copyright infringement prevention program 200 determines file 114 contains approved copyrighted materials (decision 224, no branch), copyright infringement prevention program 200 prints file 114 (step 226). In step 226, copyright infringement prevention program 200, prints file 114 and stores the print job request information (e.g., metadata and file attributes associated with file 114) in printable file attribute storage 122. In one embodiment, copyright infringement prevention program 200 updates previously existing entries in printable file attribute storage 122 (e.g., updates the number of allowed printed copies by the number of prints requested, updates print permission field). Additionally, copyright infringement prevention program 200 may update the embedded metadata of file 114.

Figure 3:
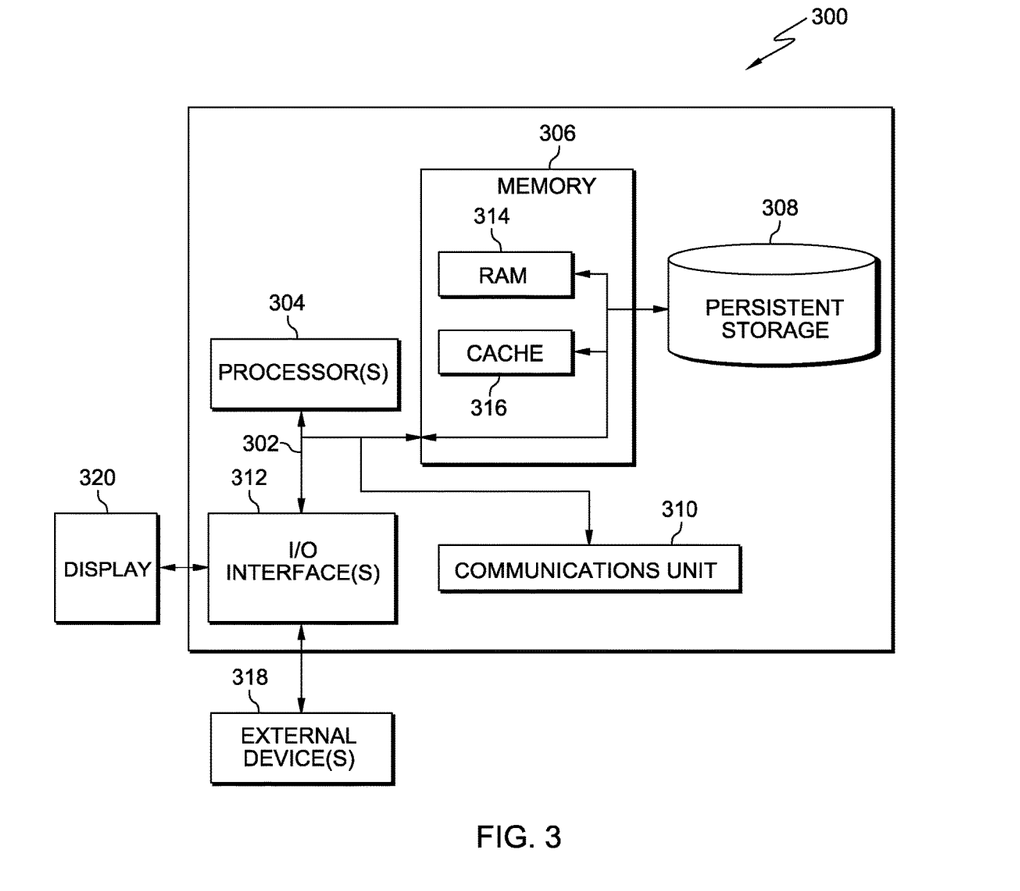
FIG. 3 is a block diagram of components of the printer device of FIG. 1 executing the copyright infringement prevention program of FIG. 2, in accordance with an embodiment of the present invention.

FIG. 3 depicts a block diagram of components of distributed data processing environment 300, in accordance with an illustrative embodiment of the present invention. It should be appreciated that FIG. 3 provides only an illustration of one implementation, and does not imply any limitations with regard to the environments in which different embodiments may be implemented. Many modifications to the depicted environment may be made.

Distributed data processing environment 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 414 and cache memory 316. In general, memory 306 can include any suitable volatile or non-volatile computer readable storage media.

Copyright infringement prevention program 200, file 114, printable file attribute storage 122, and printer buffer 142 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of enterprise grid and client devices. In these examples, communications unit 310 includes one or more network interface cards. Communications unit 310 may provide communications through the use of either or both physical and wireless communications links. Copyright infringement prevention program 200, file 114, printable file attribute storage 122, and printer buffer 142 may be downloaded to persistent storage 308 through communications unit 310.

I/O interface(s) 312 allows for input and output of data with other devices that may be connected to distributed data processing environment 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., copyright infringement prevention program 200, file 114, printable file attribute storage 122, and printer buffer 142, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining printability of an electronic file, the method comprising:

electronically receiving, by one or more computer processors, a file for printing;

determining, by the one or more computer processors, whether data associated with the electronically received file for printing is stored within a separate database;

responsive to determining the data associated with electronically received file for printing is not stored within a separate database, creating, by the one or more computer processors, an entry within the separate database, wherein the entry stores the data associated with the electronically received file, wherein the data includes copyright ownership, licensing terms, a printability attribute, and a print permission field that counts a number of printed copies allowed;

parsing, by the one or more computer processors, the electronically received file for one or more of text, images, and formatting indicative of copyrighted material;

responsive to identifying any text, images, or formatting indicative of copyrighted material, identifying, by the one or more computer processors, potential copyrighted material within the electronically received file associated with the identified any text, images, or formatting indicative of copyrighted material, wherein a copyright is not identified and is unknown with respect to the identified potential copyrighted material;

determining, by the one or more computer processors, whether the electronically received file may be printed based, at least in part, on the identified potential copyrighted material; and responsive to determining the electronically received file may be printed based at least in part, on the identified potential copyrighted material, printing, by the one or more computer processors, the electronically received file.

2. The method of claim 1, wherein text indicative of copyrighted material include keywords, an International Standard Book Number, and an International Standard Serial Number;

wherein images indicative of copyrighted material include copyright symbols and barcodes; and wherein formatting indicative of copyrighted material includes use of stanza that includes repetitive lines of text, drop cap based print that includes an enlarged first letter of a first word starting a paragraph that spans multiple lines, and text in columns.

3. The method of claim 1, wherein identifying the potential copyrighted material within the file comprises, based on location within the file of the identified text, images, or formatting indicative of copyrighted material, selecting at least one portion of the file corresponding to the location.

4. The method of claim 1, wherein determining whether the file may be printed based, at least in part, on the identified potential copyrighted material comprises:
matching at least a portion of the identified potential copyrighted material to approved material, wherein approved material comprises one or both of: material to which a copyright or license is owned by a designated entity and material which has been designated as printable.

5. The method of claim 1, wherein determining whether the file may be printed based, at least in part, on the identified potential copyrighted material comprises:
searching one or more online resources for the identified potential copyrighted material; and
responsive to failing to match the identified potential copyrighted material to existing material, determining that the file is printable.

6. The method of claim 1, wherein determining whether the file may be printed based, at least in part, on the identified potential copyrighted material comprises:
searching one or more online resources for the identified potential copyrighted material;
responsive to matching the identified potential copyrighted material to existing material, determining whether printing the existing material is prohibited; and
responsive to determining printing the existing material is not prohibited, determining that the file is printable.

7. The method of claim 6, wherein determining whether printing the existing material is prohibited comprises one or more of the following:
determining that a copyright or license is owned by a designated entity through a search of an online database service that includes existing copyright permissions for the designated entity;
determining that a copyright term for the existing material has expired wherein the existing material is located in public domain; and
determining that a percentage of the existing material replicated in the potential copyrighted material as determined by a plagiarism checker passes a threshold with regards to fair use.

8. The method of claim 1, further comprising saving the determination of printability as an attribute of the electronically received file.

9. The method of claim 8, wherein the printability attribute of the electronically received file is saved within the created entry in the separate database separate from the electronically received file, along with at least one additional identifying attribute.

10. The method of claim 9, further comprising:
receiving again the electronically received file for printing, subsequent to the determination of printability;
locating attributes of the electronically received file in the database separate from the electronically received file based on a comparison of embedded attributes of the electronically received file with the at least one identifying attribute in the database; and
determining printability based the printability attribute stored in the database.

11. A computer program product for determining printability of an electronic file, the computer program product comprising:
one or more computer readable storage media having program instructions therewith, the program instructions executable by a computer to cause the computer to:
electronically receive a file for printing;
determine whether data associated with the electronically received file for printing is stored within a separate database;
responsive to determining the data associated with the electronically received file for printing is not stored within a separate database, create an entry within the separate database, wherein the entry stores the data associated with the electronically received file, wherein the data includes copyright ownership, licensing terms, a printability attribute, and a print permission field that counts a number of printed copies allowed;
parse the file for one or more of text, images, and formatting indicative of copyrighted material;
responsive to identifying any text, images, or formatting indicative of copyrighted material, identify potential copyrighted material within the electronically received file associated with the identified any text, images, or formatting indicative of copyrighted material, wherein a copyright is not identified and is unknown with respect to the identified potential copyrighted material;
determine whether the electronically received file may be printed based, at least in part, on the identified potential copyrighted material; and
responsive to determining the electronically received file may be printed based at least in part, on the identified potential copyrighted material, print the electronically received file.

12. The computer program product of claim 11, wherein text indicative of copyrighted material include keywords, an International Standard Book Number, and an International Standard Serial Number;
wherein images indicative of copyrighted material include copyright symbols and barcodes; and
wherein formatting indicative of copyrighted material includes use of stanza that includes repetitive lines of text, drop cap based print that includes an enlarged first letter of a first word starting a paragraph that spans multiple lines, and text in columns.

13. The computer program product of claim 11, wherein determining whether the file may be printed based, at least in part, on the identified potential copyrighted material comprises program instructions, stored on the one or more computer readable storage media, to:
match at least a portion of the identified potential copyrighted material to approved material, wherein approved material comprises one or both of: material to which a copyright or license is owned by a designated entity and material which has been designated as printable.

14. The computer program product of claim 11, wherein determining whether the file may be printed based, at least in part, on the identified potential copyrighted material comprises program instructions, stored on the one or more computer readable storage media, to:
search one or more online resources for the identified potential copyrighted material; and responsive to failing to match the identified potential copyrighted material to existing material, determine that the file is printable.

15. The computer program product of claim 11, wherein determining whether the file may be printed based, at least in part, on the identified potential copyrighted material comprises program instructions, stored on the one or more computer readable storage media, to:
search one or more online resources for the identified potential copyrighted material;
responsive to matching the identified potential copyrighted material to existing material, determine whether printing the existing material is prohibited; and
responsive to determining printing the existing material is not prohibited, determine that the file is printable.

16. The computer program product of claim 15, wherein determining whether printing the existing material is prohibited comprises one or more of the following program instructions, stored on the one or more computer readable storage media, to:
determine that a copyright or license is owned by a designated entity through a search of an online database service that includes existing copyright permissions for the designated entity;
determine that a copyright term for the existing material has expired wherein the existing material is located in public domain; and
determine that a percentage of the existing material replicated in the potential copyrighted material determined by a plagiarism checker passes a threshold with regards to fair use.

17. A computer system for determining printability of an electronic file, the computer system comprising:
one or more computer processors, one or more computer readable storage media, and program instructions stored on the computer readable storage media for execution by at least one of the one or more processors, the program instructions comprising:
program instructions to electronically receive a file for printing;
program instructions to determine whether data associated with the electronically received file for printing is stored within a separate database;
responsive to determining the data associated with the electronically received file for printing is not stored within a separate database, program instructions to create an entry within the separate database, wherein the entry stores the data associated with the electronically received file, wherein the data includes copyright ownership, licensing terms, a printability attribute, and a print permission field that counts a number of printed copies allowed;
program instructions to parse the file for one or more of text, images, and formatting indicative of copyrighted material;
program instructions to responsive to identifying any text, images, or formatting indicative of copyrighted material, identify potential copyrighted material within the electronically received file associated with the identified any text, images, or formatting indicative of copyrighted material, wherein a copyright is not identified and is unknown with respect to the identified potential copyrighted material;
program instructions to determine whether the electronically received file may be printed based, at least in part, on the identified potential copyrighted material; and
responsive to determining the electronically received file may be printed based at least in part, on the identified potential copyrighted material, print the electronically received file.

18. The computer system of claim 17, wherein determining whether the file may be printed based, at least in part, on the identified potential copyrighted material comprises program instructions, stored on the one or more computer readable storage media, to:
match at least a portion of the identified potential copyrighted material to approved material, wherein approved material comprises one or both of: material to which a copyright or license is owned by a designated entity and material which has been designated as printable.

19. The computer system of claim 17, wherein determining whether the file may be printed based, at least in part, on the identified potential copyrighted material comprises program instructions, stored on the one or more computer readable storage media, to:
search one or more online resources for the identified potential copyrighted material;
responsive to matching the identified potential copyrighted material to existing material, determine whether printing the existing material is prohibited and
responsive to determining printing the existing material is not prohibited, determining that the file is printable.

20. The computer system of claim 19, wherein determining whether printing the existing material is prohibited comprises one or more of the following program instructions, stored on the one or more computer readable storage media, to:
determine that a copyright or license is owned by a designated entity through a search of an online database service that includes existing copyright permissions for the designated entity;
determine that a copyright term for the existing material has expired wherein the existing material is located in public domain; and
determine that a percentage of the existing material replicated in the potential copyrighted material as determined by a plagiarism checker passes a threshold with regards to fair use.

* * * * *